(12) United States Patent
Gretz

(10) Patent No.: US 8,044,300 B1
(45) Date of Patent: Oct. 25, 2011

(54) TWO-GANG LOW VOLTAGE MOUNTING BRACKET WITH FRONT PLATE AND RETRACTABLE CLAMP ARMS FOR RAPID MOUNTING USING HOLE SAW

(75) Inventor: Thomas J. Gretz, Port St. Lucie, FL (US)

(73) Assignee: Arlington Industries, Inc., Scranton, PA (US)

(*) Notice: Subject to any disclaimer, the term of this patent is extended or adjusted under 35 U.S.C. 154(b) by 425 days.

(21) Appl. No.: 12/386,940

(22) Filed: Apr. 24, 2009

Related U.S. Application Data

(63) Continuation-in-part of application No. 12/319,648, filed on Jan. 9, 2009, which is a continuation-in-part of application No. 12/012,907, filed on Feb. 6, 2008, now Pat. No. 7,759,576, and a continuation-in-part of application No. 12/008,120, filed on Jan. 9, 2008, now Pat. No. 7,586,039.

(51) Int. Cl.
*H01H 9/02* (2006.01)
(52) U.S. Cl. ............... 174/58; 174/63; 174/57; 174/61; 248/343
(58) Field of Classification Search ............ 174/53, 174/54, 55, 57, 58, 61, 63, 50; 220/3.6, 3.8, 220/3.9; 439/535; 248/906, 343; 361/730
See application file for complete search history.

(56) References Cited

U.S. PATENT DOCUMENTS

| | | | |
|---|---|---|---|
| 3,137,763 A * | 6/1964 | Jones | 174/61 |
| 4,863,399 A | 9/1989 | Medlin, Jr. | |
| 6,103,972 A * | 8/2000 | Hagarty | 174/53 |
| 6,346,674 B1 | 2/2002 | Gretz | |
| 6,508,445 B1 | 1/2003 | Rohmer | |
| 7,186,916 B2 | 3/2007 | Jacks | |
| D539,751 S | 4/2007 | Kiely | |
| 7,902,457 B2 * | 3/2011 | Johnson | 174/61 |
| 7,910,827 B2 * | 3/2011 | Hur et al. | 174/53 |

* cited by examiner

*Primary Examiner* — Dhirubhai R Patel

(57) ABSTRACT

A two-gang low voltage bracket that enables rapid mounting of one or two low voltage electrical components to a wall. The two-gang bracket includes a front plate with an opening therein and a circular peripheral wall surrounding the opening and extending from the rear surface of the plate. Mounting fasteners extend through oversize holes in the plate and include clamp arms rigidly secured to their ends. The circular peripheral wall is of a diameter that is slightly less than the diameter of a standard size hole-saw. The clamp arms can be rotated to either a retracted or extended position. The peripheral wall is provided with open areas or recesses to fully accommodate the clamp arms when retracted thereby enabling the peripheral wall and clamp arms to pass easily within the wall opening created by the standard size hole-saw.

16 Claims, 6 Drawing Sheets

TWO-GANG LOW VOLTAGE MOUNTING BRACKET WITH FRONT PLATE AND RETRACTABLE CLAMP ARMS FOR RAPID MOUNTING USING HOLE SAW

This application is a Continuation-In-Part of U.S. patent application Ser. No. 12/319,648 filed Jan. 9, 2009 and still pending, which is a Continuation-In-Part of U.S. patent application Ser. No. 12/012,907 filed Feb. 6, 2008, now U.S. Pat. No. 7,759,576 and is a Continuation-In-Part of U.S. patent application Ser. No. 12/008,120 filed Jan. 9, 2008, now U.S. Pat. No. 7,586,039 of which the entire contents of all of the aforementioned related applications are incorporated herein by reference.

FIELD OF THE INVENTION

This invention relates to devices for mounting low voltage electrical components to a wall and specifically to a low voltage bracket with a frame member and retractable clamp arms for rapid mounting to a wall through a round aperture.

BACKGROUND OF THE INVENTION

With the proliferation of digital components in homes there has been an increase in the amount of low voltage cables installed in the homes, such as communications cables, coaxial cables for cable TV, and various cables for digital videodisc players, game stations, surround sound systems, and various other auxiliary devices. Large amounts of low voltage cables can be unattractive as they clutter up the floor and become unsightly.

One common method of dealing with these large amounts of cables is to route them through the walls of the home. Conventional low voltage mounting devices typically are installed by first cutting a rectangular hole in the wall. Frequently, this involves finding the location of a stud, cutting the rectangular hole next to the stud, and then attaching the low voltage mounting device to the stud.

Although the aforementioned procedure provides a means of mounting a low voltage device to a wall, it usually requires a substantial amount of time to locate a stud and prepare an appropriately sized rectangular hole to accept the mounting device. U.S. patent application Ser. Nos. 12/319,648, 12/012,907, and 12/008,120, the entire contents of which have been incorporated herein by reference thereto, all discloses electrical mounting devices that could be mounted in a fraction of the time required for most conventional electrical mounting devices. The significant savings in installation time of the mounting devices presented in these related applications was a result of a simplified wall preparation procedure which required that only a simple circular hole be formed in the sheetrock of the wall. This significantly reduces wall preparation time as a conventional hole-saw can be used to prepare the installation site. Conventional hole-saws are easily obtainable at any hardware store and simply consist of a circular mandrel with cutting teeth that can be attached to a conventional hand held drill.

Although the related applications presented an improved device for mounting electrical components on the wall, they were limited to mounting a single electrical component per mounting device. The present invention provides a mounting device that is capable of mounting two low voltage electrical components side by side in a single mounting device.

SUMMARY OF THE INVENTION

The invention is an electrical mounting device for securing one or two low voltage electrical components to a wall. The electrical mounting device includes a front plate having a front surface, a rear surface, an opening, and a rearward extending peripheral wall surrounding the opening and extending from the rear surface of the plate. Bosses with oversize holes are provided in the plate adjacent the opening for accommodating mounting fasteners. The mounting fasteners include heads accessible from the front of the plate and clamp arms secured rigidly to the ends of the fasteners. The peripheral wall is substantially round and includes a diameter that is slightly less than the diameter of a standard size hole-saw. The clamp arms can be rotated to either an inward position or an outward position. The peripheral wall is provided with open areas or recesses to fully accommodate the clamp arms when rotated to the inward position thereby enabling the peripheral wall and clamp arms to pass easily within the wall opening created by the standard size hole-saw.

OBJECTS AND ADVANTAGES

Several advantages are achieved with the electrical mounting device of the present invention, including:
(1) The electrical mounting device can be used to rapidly mount one or two low voltage electrical components on a wall.
(2) Wall preparation time is minimal as only a simple circular hole created by a standard size hole-saw is required in the drywall for mounting the electrical mounting device of the present invention to the wall.
(3) All the hardware for securing an electrical component to the wall is included with the electrical mounting device.
(4) The electrical mounting device can be easily installed on a wall with minimal prep work as the assembly is simply pressed into a circular hole that is easily made with a hole-saw.
(5) The electrical mounting device includes openings or recesses to enable the clamp arms to retract completely within the profile of the rearward extending peripheral wall thereby enabling the clamp arms to fit within the circular opening created by the hole-saw.
(6) The electrical mounting device enables the mounting of conventional low voltage electrical components, such as cable TV jacks or phone jacks, with minimal wall preparation consisting of a simple circular hole in a wall.
(7) All portions of the rearward extending sidewall of the electrical mounting device are sized to fit easily through a circular hole created by a standard sized hole-saw.
(8) The electrical mounting device of the present invention significantly reduces the amount of time required for mounting one or two electrical components to a wail.
(9) Cable loops are provided for bundling and tying-off wires and cables, thereby providing a means for restraining cables so they don't fall behind the wall prior to attaching them to the low voltage components that will be secured to the bracket.

These and other objects and advantages of the present invention will be better understood by reading the following description along with reference to the drawings.

Figure 1:
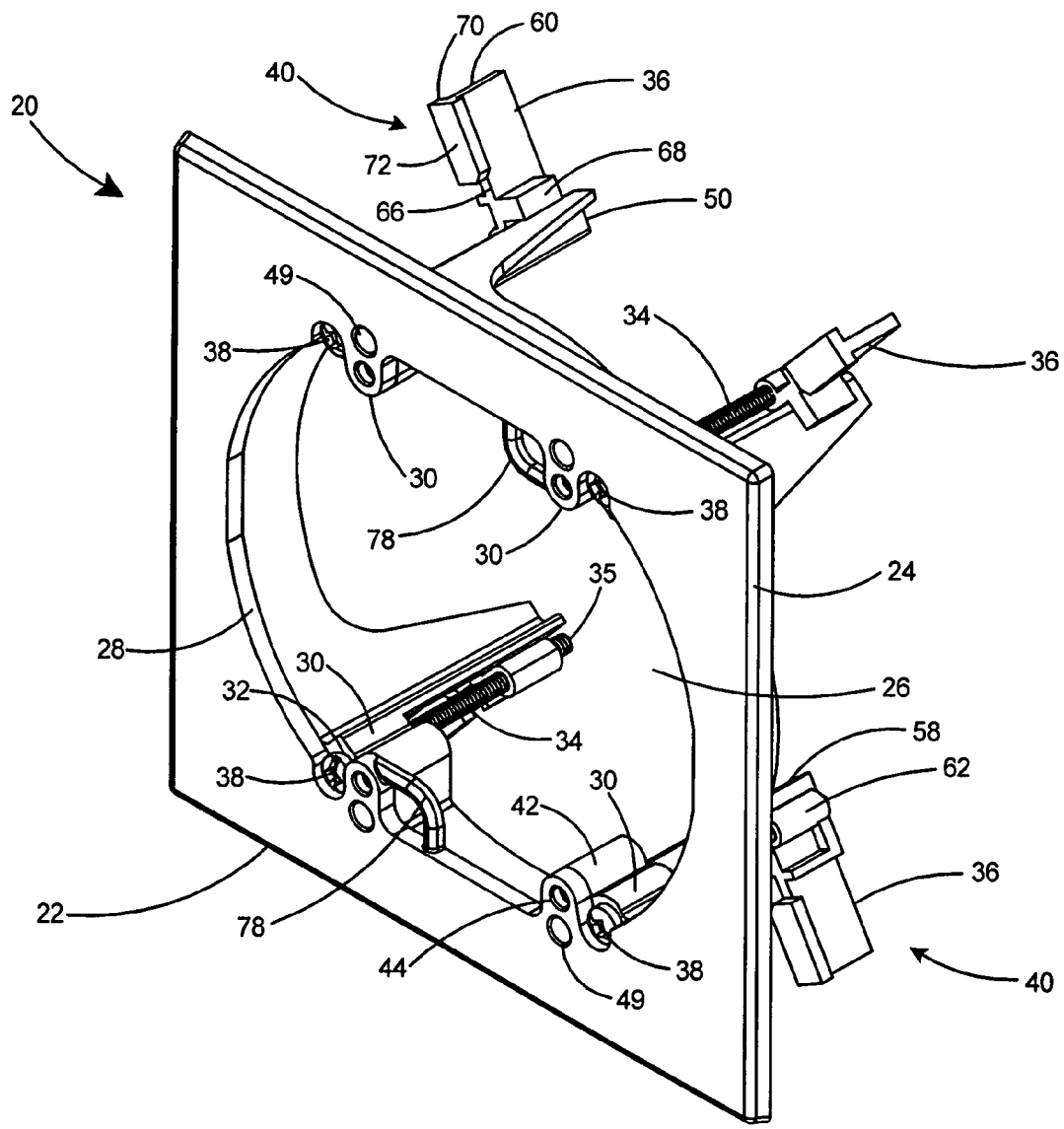
FIG. 1 is a front perspective view of a preferred embodiment of a two-gang low voltage mounting bracket according to the present invention.

INDEX TO REFERENCE NUMERALS IN DRAWINGS 20 two-gang low voltage mounting bracket, preferred embodiment
22 front plate
24 contoured periphery
26 opening
28 inner periphery of plate at opening
30 mounting boss
32 oversize mounting aperture
34 mounting fastener
35 end of mounting fastener
36 clamp arm
38 head of fastener
39 retracted position of clamp arm
40 extended position of clamp arm
42 component boss
44 aperture
46 rear surface of plate
48 circular peripheral sidewall
49 faceplate aperture
50 L-shaped post
51 notch in circular peripheral sidewall
52 frame member
53 direction of rotation of clamp arm
58 proximal end of clamp arm
60 distal end of clamp arm
62 base portion of clamp arm
64 bore through base portion of clamp arm
66 stem portion
68 tab
70 foot
72 flat face
74 first edge on post
76 second edge
78 cable loop
80 hole in wall
82 sheet rock
84 wall
A1, A2 axes through component bosses
Θ1 angle of rotation of the clamp arm
D1 outer diameter or outer periphery of circular peripheral wall
D2 second diameter or diameter at which first edges are located

DETAILED DESCRIPTION OF THE INVENTION

The present invention is a two-gang low voltage mounting bracket that significantly reduces the amount of time required to install two side-by-side low voltage electrical components on a wall. As shown in FIG. 1, the two-gang low voltage mounting bracket 20 of the present invention includes a front plate 22 having a contoured periphery 24 and an opening 26 with an inner periphery 28. Four mounting bosses 30, integral with the plate 22, are provided along the inner periphery 28. The mounting bosses 30 include oversize mounting apertures 32 therein. Substantially long mounting fasteners 34 include ends 35 that extend through the oversize mounting apertures 32 in the mounting bosses 30 and each mounting fastener 34 includes a clamp arm 36 secured rigidly to the end 35 of the fastener 34. Thus each mounting fastener 34 can be easily rotated within its oversize mounting aperture 32 as desired by turning the head 38 of the respective fastener 34 with an appropriate tool such as a screwdriver (not shown). Each clamp arm 36 can therefore be rotated between a retracted position 39 and extended position 40 as desired. FIG. 1 depicts the clamp arms 36 in the extended position 40.

Figure 2:
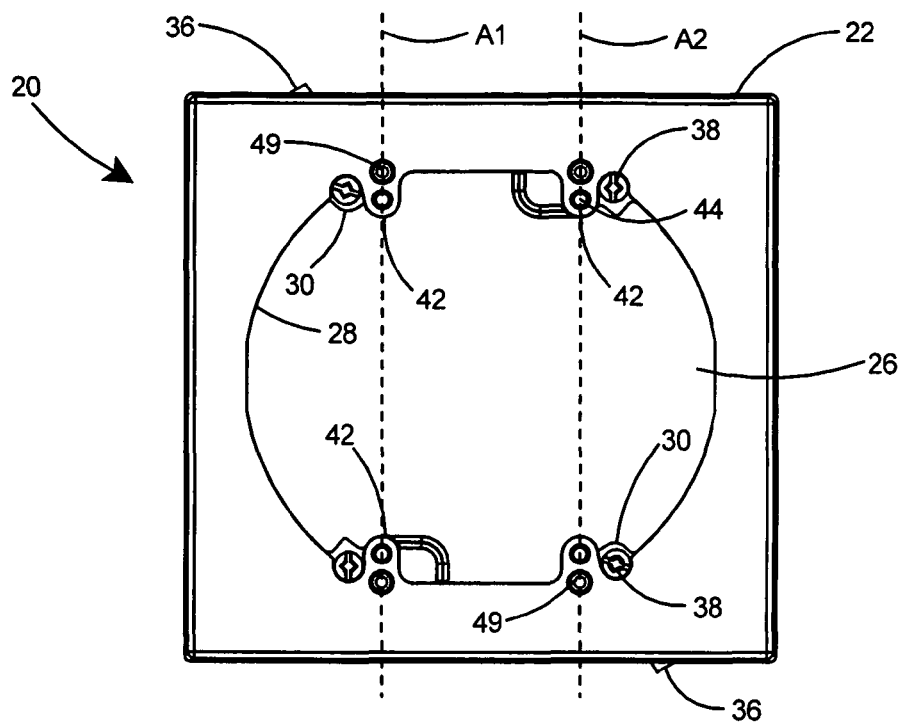
FIG. 2 is a front view of the two-gang low voltage mounting bracket of FIG. 1, with the clamp arms rotated to an extended position.
Figure 3:
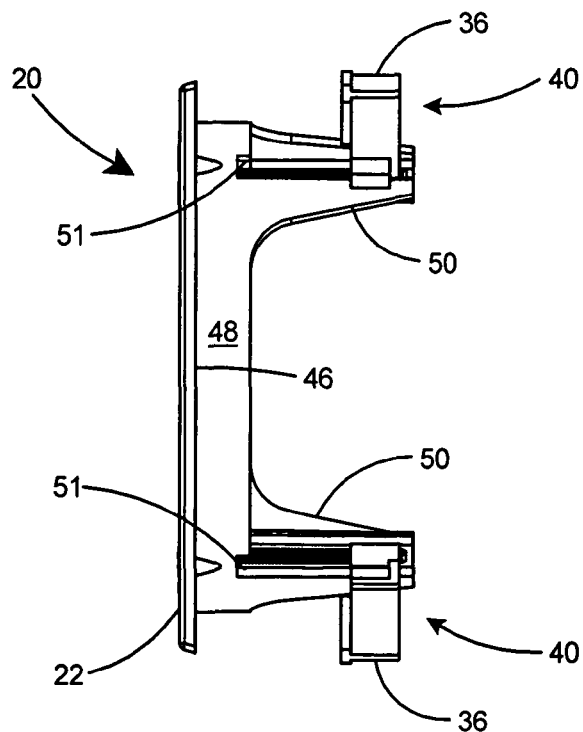
FIG. 3 is a side view of the two-gang low voltage mounting bracket of FIG. 2.

With reference to FIGS. 2 and 3, which depict the clamp arms 36 in the extended position 40, the two-gang low voltage mounting bracket 20 further includes four component bosses 42 along the inner periphery 28 of the plate 22 at the opening 26 and apertures 44 for the connection of low voltage electrical components (not shown). The four component bosses 42 are arranged in two vertically aligned pairs with one component boss pair along each of axes A1 and A2 as shown in FIG. 2. The vertically aligned pairs of component bosses 42 will enable side-by-side mounting of two low voltage electrical components (not shown). The component bosses 42 further include faceplate apertures 49 for accepting fasteners for accommodating attachment of a complementary faceplate (not shown) for the low voltage components. The faceplate apertures 49 are located outward of the component apertures 44 but both faceplate apertures 49 and component apertures 44 are inward of the circular peripheral sidewall 48. As shown in FIG. 3, the rear surface 46 of the plate 22 includes a circular peripheral sidewall 48. Four L-shaped posts 50, substantially L-shaped in cross section, extend rearward from the peripheral sidewall 48 immediately adjacent to each mounting boss 30. A notch 51 is provided in the circular peripheral sidewall 48 adjacent each post 50. The notch 51 engages the clamp arm 36 when the clamp arm 36 is fully tightened and thus enables the two-gang low voltage mounting bracket 20 to accommodate a narrower wall thickness and thereby a wider range of wall thicknesses. The notch 51 also engages the clamp arm 36 when it is tightened therein thus preventing inadvertent loosening of the clamp arms 36 after the bracket 20 is secured to a wall.

Figure 4:
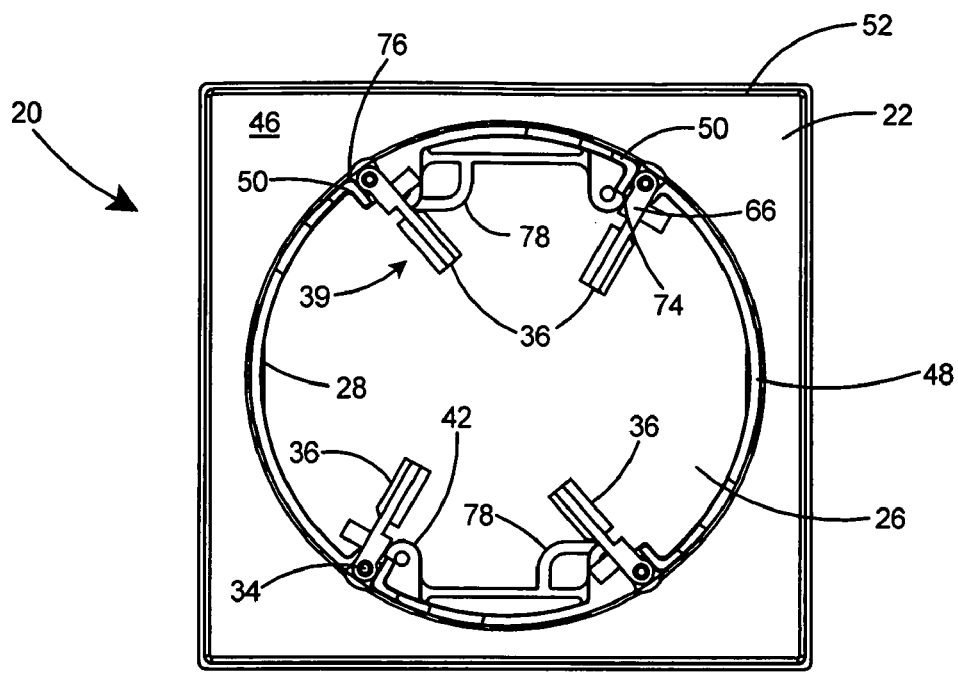
FIG. 4 is a rear view of the two-gang low voltage mounting bracket of FIG. 1, with the clamp arms rotated to a retracted position.
Figure 5:
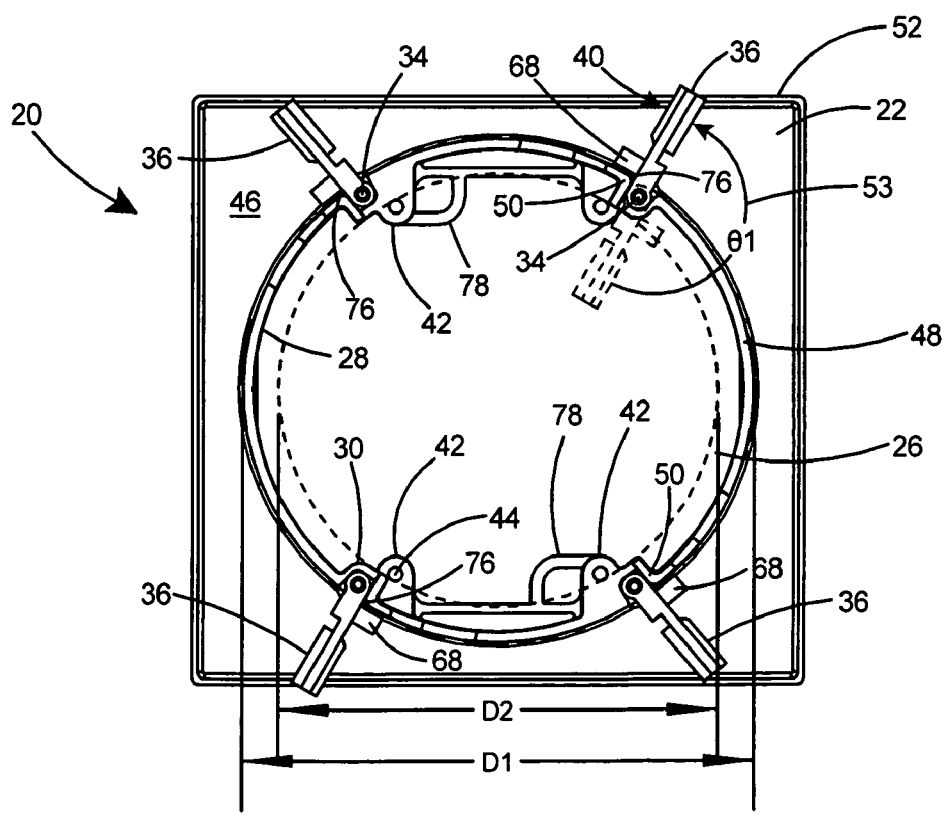
FIG. 5 is a rear view of the two-gang low voltage mounting bracket of FIG. 1, with the clamp arms rotated to an extended position.

As shown in FIG. 4 with the clamp arms 36 rotated to their retracted position 39, the clamp arms 36 are confined completely within the perimeter of the sidewall 48. The front plate 22, sidewall 48, and posts 50 together form a low voltage frame member 52. The frame member 52 is typically molded in one-piece of plastic. As shown in FIG. 5, the clamp arms 36 can be rotated from the retracted position 39 (shown in FIG. 4) to an extended position 40, or vice versa, by turning mounting fastener 34 clockwise as viewed from the front of the plate 22 or equivalently counterclockwise as viewed from the rear of the plate 22 as shown by directional arrows 53 in FIG. 5.

Figure 6:
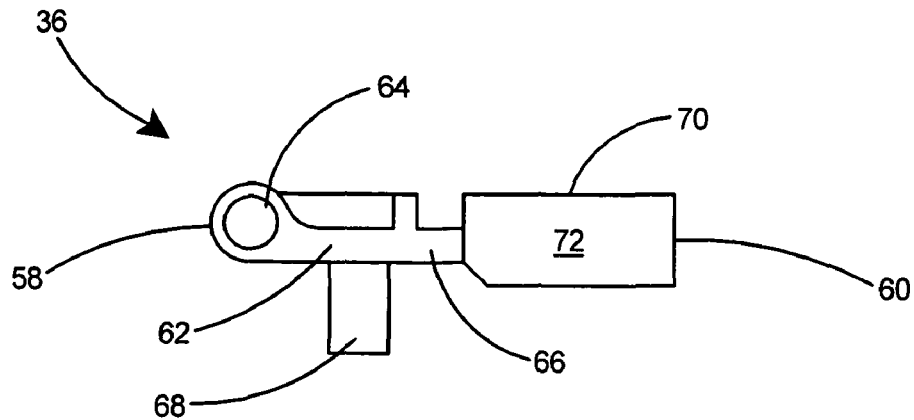
FIG. 6 is a detail view of a clamp arm of the low voltage mounting device of FIG. 1.
Figure 7:
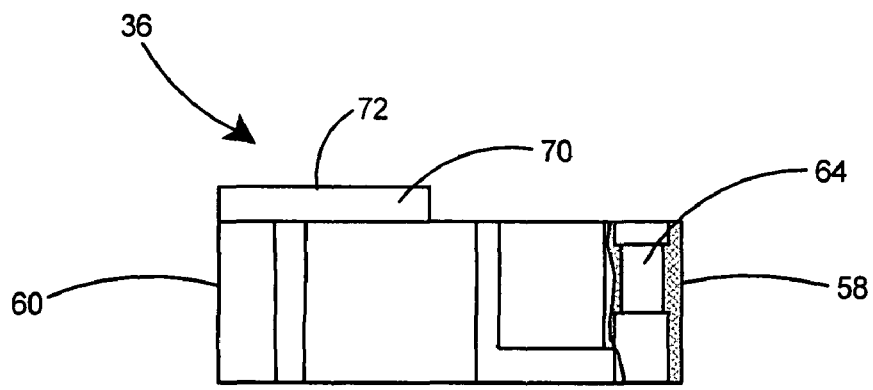
FIG. 7 is a side view of the clamp arm of FIG. 6 with a portion broken away.
Figure 8:
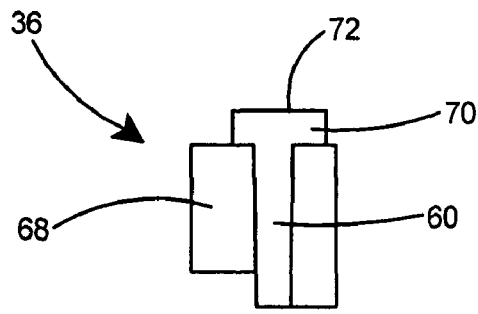
FIG. 8 is an end view of the clamp arm of FIG. 6.
Figure 9:
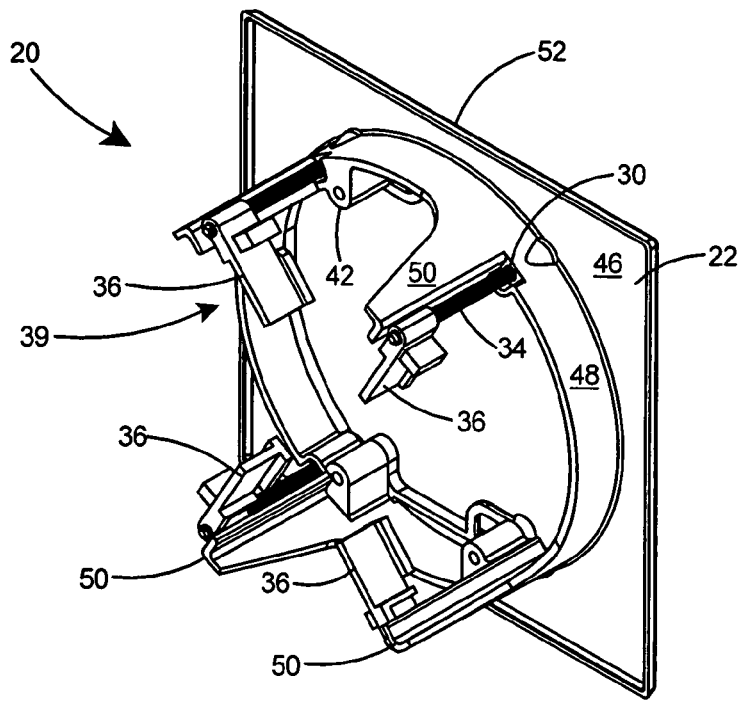
FIG. 9 is a rear perspective view of the two-gang low voltage mounting bracket of FIG. 1, with the clamp arms rotated to a retracted position.
Figure 10:
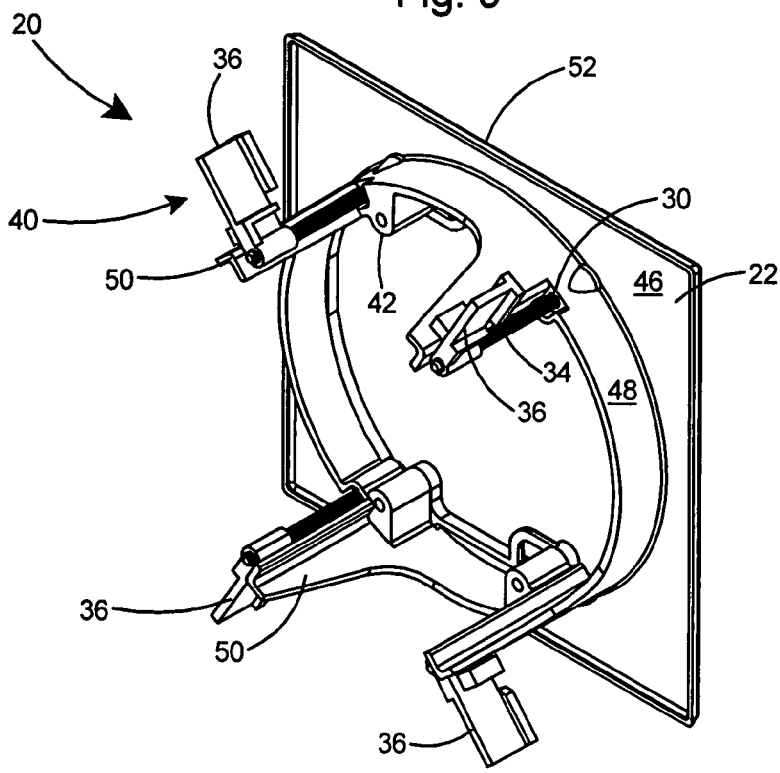
FIG. 10 is a rear perspective view of the two-gang low voltage mounting bracket of FIG. 1, with the clamp arms rotated to an expanded position.

With reference to FIGS. 6-8, each clamp arm 36 includes a proximal end 58 and a distal end 60. Clamp arm 36 includes a base portion 62 having a bore 64 therein, a stem portion 66, an outward extending tab 68, a foot 70 at the distal end 60, and a flat face 72 on the foot 70. Base portion 62 of clamp arm 36 includes bore 64 through which the mounting fastener will extend. The flat face 72 of the foot 70 is substantially flat to enable the face 72 to engage the rear surface of a wall (not shown) when the clamp arm 36 is tightened or clamped against a wall.

As shown in FIG. 5, as the clamp arm 36 is rotated fully in the direction of arrow 53, the tab 68 engages the L-shaped post 50 and stops the travel of the clamp arm 36 thereby positioning the clamp arm 36 in the extended position 40. Conversely, as shown in FIG. 4, if the clamp arm 36 is rotated fully in the direction opposite of arrow 53 in FIG. 5, the stem 66 of the clamp arm 36 engages a first edge 74 on L-shaped post 50 thereby positioning the clamp arm 36 in the retracted position 39.

Circular sidewall 48 of two-gang low voltage mounting bracket 20 includes an outer periphery or outer diameter D1. Preferably, outer diameter D1 is 4.5 inches or slightly less. Most preferably, diameter D1 is between 4.4900 and 4.4999 inches. As shown in FIGS. 4 and 5, the first edge 74 is at a second diameter D2, which is a smaller diameter than the outer periphery D1 of the sidewall 48, and first edge 74 positions the clamp arms 36 in the retracted position 39 thereby retracting all portions of the clamp arms 36 within the outer periphery D1 of the sidewall 48. The total angle of rotation Θ1 of the clamp arm 36 from the retracted position 39 to the extended position 40 is 180°. Each clamp arm 36 is situated adjacent a corresponding post 50 on opposite sides of the sidewall 48. As viewed from the front side of the front plate 22, rotation of the clamp arms 36 fully counterclockwise will position the clamp arms 36 in the retracted position 39 and rotation of the clamp arms 36 fully clockwise will position the clamp arms 36 in the extended position 40. The L-shaped post 50 is located along the sidewall 48 immediately adjacent to the mounting boss 30 through which the mounting fastener 34 extends. A second edge 76 is provided on each L-shaped post 50 to stop the rotation of the clamp arm 36 when it is fully turned clockwise to the extended position 40 and thus properly position the clamp arm 36 behind the sheetrock. The two-gang low voltage mounting bracket 20 further includes two cable loops 78 extending from the inner periphery 28 of said plate 22, one on each side of the bracket 20. The cable loops 78 provide an easily accessible member for tying off low voltage cables (not shown) after the bracket 20 is mounted on a wall.

Figure 11:
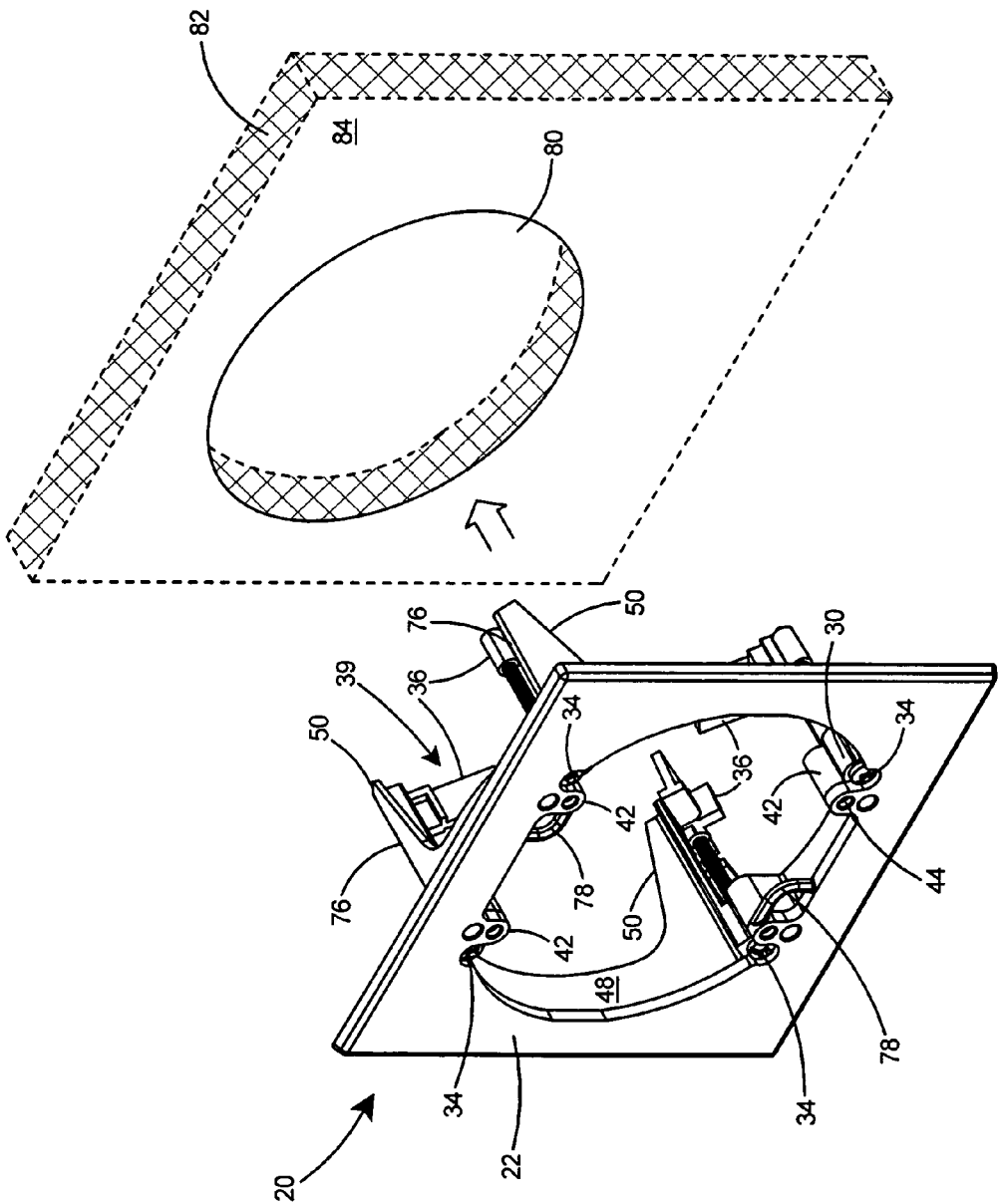
FIG. 11 is a front perspective view of the two-gang low voltage mounting bracket with the clamp arms rotated to the retracted position and in alignment with a hole in a wall to which it will be secured.

Reference is directed to FIG. 11 for an understanding of the operation of the two-gang low voltage mounting bracket 20 of the present invention. The two-gang low voltage mounting bracket 20 is shown with the clamp arms 36 all rotated to their retracted positions 39. In the retracted position 39, the clamp arms 36 are positioned completely within the circular peripheral wall 48. Circular peripheral wall 48 is of a slightly smaller diameter than the diameter of a 4.5-inch standard size hole-saw. Thus, using a conventional 4.5-inch hole-saw, an installer makes a 4.5-inch diameter hole 80 in the sheet rock 82 or equivalent wall covering of a wall 84. With the clamp arms 36 rotated to the retracted position 39, the two-gang low voltage mounting bracket 20 is simply inserted into the hole 80. After the front plate 22 of the bracket 20 is flush against the wall 84, the installer simply turns mounting fasteners 34, which are easily accessible from the front of the bracket 20, clockwise to secure the bracket 20 to the wall 84. The first 180 degrees of rotation of the mounting fasteners 34 causes each clamp arm 36 to engage second edge 76 of L-shaped post 50. Subsequent rotation of the mounting fasteners 34 draws the clamp arms 36 toward the rear surface of wall 84 and eventually clamps the two-gang low voltage mounting bracket 20 onto the wall 84 with the wall 84 clamped between each clamp arm 36 and the plate 22 of the bracket 20. After the two-gang low voltage mounting bracket 20 is clamped securely to the wall 84, cables can be pulled through opening 26 and tied off on either of the cable loops 78. Typically, the cables for the left-side component (not shown) will be tied to the left-side cable loop 78 and the cables for the right-side component will be tied to the right-side cable loop 78. A low voltage component (not shown), such as a phone jack or a cable-TV jack, can then be connected to the appropriate low voltage cables and secured to either the left or right side component bosses 42 to complete the installation.

Prior art low voltage brackets required an inordinate amount of time for installation as they typically were of rectangular shape and required a correctly sized rectangular hole to be made in the wall. As should be apparent from the above description of the preferred embodiment and its method of operation, the two-gang low voltage mounting bracket 20 enables an installer to rapidly install two low voltage components in a side-by-side arrangement on a wall. The two-gang low voltage mounting bracket 20 of the present invention significantly reduces the amount of time required to provide a proper mounting device for two low voltage components on a wall. This significant savings in installation time is a result of the circular peripheral wall that is sized slightly smaller than a standard side hole-saw, the provision of rotatable clamp arms 36 that can be rotated from a retracted to an extended position, and the fact that the clamp arms 36 in the retracted position are completely within the circular peripheral wall 48 thereby allowing the two-gang low voltage mounting bracket 20 to slip easily into the hole created by the hole-saw. The entire sequence of drilling the hole and installing the two-gang low voltage mounting bracket 20 of the present invention requires only 20 to 30 seconds thereby offering significant time savings as compared to the installation of conventional two-gang low voltage brackets, which typically take 10 to 12 minutes to install as a result of the extensive wall preparation that is required.

The frame member 52 portion of the two-gang low voltage mounting bracket 20 of the present invention, which includes the plate 22, the circular peripheral sidewall 48, the L-shaped posts 50, the mounting bosses 30, and the component bosses 42, may be constructed of metal or plastic but is most preferably molded in one piece of plastic. The frame member 52 can be molded of any suitable plastic including polycarbonate, polyvinylchloride, acrylonitrile butadienestyrene, or a polyolefin.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A two-gang low voltage mounting bracket for mounting two low voltage electrical components to a wall comprising:
   a plate having a rear surface and an opening therein;
   a circular peripheral sidewall surrounding said opening and extending from said rear surface of said plate;

a plurality of posts extending from said circular peripheral sidewall;

a plurality of oversize mounting apertures in said plate;

a mounting fastener including an end extending through each of said oversize mounting apertures in said plate, said mounting fastener capable of free rotation with respect to said plate;

a clamp arm rigidly secured to said end of said mounting fastener whereby said clamp arm rotates with rotation of said mounting fastener;

said clamp arm capable of being rotated from a retracted position to an extended position; and said clamp arm in said retracted position is within said circular peripheral sidewall.

2. The two-gang low voltage mounting bracket of claim 1 including an inner periphery on said plate at said opening;

four component bosses along said inner periphery of said plate at said opening; and apertures in said component bosses for the connection of low voltage electrical components thereto.

3. The two-gang low voltage mounting bracket of claim 2 wherein said four component bosses are arranged in two vertically aligned pairs.

4. The two-gang low voltage mounting bracket of claim 3 including a faceplate aperture therein in each of said component bosses, said faceplate aperture for accommodating a faceplate for said low voltage components.

5. The two-gang low voltage mounting bracket of claim 2 including a cable loop extending from the inner periphery of said plate, said cable loop providing an easily accessible member for tying off low voltage cables.

6. The two-gang low voltage mounting bracket of claim 2 wherein each of said oversize mounting apertures in said plate is in a mounting boss;

said mounting boss is integral with said inner periphery of said plate; and each of said oversize mounting apertures in said mounting boss include a larger diameter than said mounting fastener.

7. The two-gang low voltage mounting bracket of claim 1 including a first edge on each of said posts for stopping the rotation of said clamp arm in a retracted position whereby said clamp arm is retracted within said circular peripheral sidewall; and a second edge on each of said posts for stopping the rotation of said clamp arm in an extended position whereby said clamp arm is extended outward of said circular peripheral sidewall.

8. The two-gang low voltage mounting bracket of claim 7 wherein said circular peripheral sidewall includes an outer diameter;

said first edge is located at a second diameter; and said second diameter is smaller than said outer diameter of said circular peripheral sidewall.

9. The two-gang low voltage mounting bracket of claim 8 wherein said outer diameter is less than 4.5 inches.

10. The two-gang low voltage mounting bracket of claim 7 wherein said clamp arm includes a proximal end and a distal end; and a base portion on said proximal end and a foot on said distal end.

11. The two-gang low voltage mounting bracket of claim 10 wherein said clamp arm includes a bore in said base portion;

a stem portion extending from said base portion;

a tab extending laterally from said stem portion; and a flat face on said foot.

12. The two-gang low voltage mounting bracket of claim 11 wherein said clamp arm is connected to said mounting fastener at said base portion; and said tab of said clamp arm engages said second edge of said circular peripheral sidewall for positioning said clamp arm in said extended position.

13. The two-gang low voltage mounting bracket of claim 1 wherein said posts are substantially L-shaped in cross section.

14. The two-gang low voltage mounting bracket of claim 1 including a notch in said circular peripheral sidewall adjacent each of said posts.

15. The two-gang low voltage mounting bracket of claim 1 wherein including four of said mounting fasteners.

16. The two-gang low voltage mounting bracket of claim 1 wherein said plate, said circular peripheral sidewall, and said plurality of posts form a low voltage frame member.

* * * * *